(12) United States Patent
Harwick

(10) Patent No.: US 8,192,096 B1
(45) Date of Patent: Jun. 5, 2012

(54) PANORAMA HEAD FOR OPTICAL EQUIPMENT

(76) Inventor: John Edward Harwick, Kennewick, WA (US)

(*) Notice: Subject to any disclaimer, the term of this patent is extended or adjusted under 35 U.S.C. 154(b) by 0 days.

(21) Appl. No.: 13/306,310

(22) Filed: Nov. 29, 2011

Related U.S. Application Data

(60) Provisional application No. 61/458,638, filed on Nov. 29, 2010.

(51) Int. Cl.
  *G03B 41/00* (2006.01)
  *G03B 17/00* (2006.01)
(52) U.S. Cl. .................................. 396/428; 396/329
(58) Field of Classification Search .................. 396/329, 396/428
  See application file for complete search history.

(56) References Cited

U.S. PATENT DOCUMENTS

| | | | | |
|---|---|---|---|---|
| 5,040,759 | A  * | 8/1991 | Wainwright | 248/186.2 |
| 5,589,903 | A    | 12/1996 | Speggiorin | |
| 5,752,113 | A  * | 5/1998 | Borden | 396/428 |
| 6,019,326 | A  * | 2/2000 | Baerwolf et al. | 248/177.1 |
| 6,895,180 | B2   | 5/2005 | Artonne et al. | 396/71 |
| 7,004,649 | B2 * | 2/2006 | Dziulko | 396/428 |
| 7,077,582 | B2 * | 7/2006 | Johnson | 396/428 |
| 7,766,562 | B2 * | 8/2010 | Dowell | 396/423 |
| 2006/0239677 | A1 * | 10/2006 | Friedrich | 396/419 |
| 2010/0254697 | A1 * | 10/2010 | Johnson | 396/428 |

OTHER PUBLICATIONS

Manfrotto, 293 Telephoto Lens Support, www.manfrotto.us, Oct. 6, 2010.*
Manfrotto and Bogen equivalent product Number table, PhotoNotes. org, Aug. 3, 2009.*
Ching-Kuang Shene, Olympus TCON-3005 3X Teleconverter Lens, www.cs.mtu.edu, Mar. 4, 2007.*
Manfrotto, Panoramic Head, www.manfrotto.us/panoramic-head, Jan. 11, 2012.*
Manfrotto 303 QTVR Panoramic Head Kit, www.bhphtovideo.com, Review, Jun. 29, 2008.*

* cited by examiner

*Primary Examiner* — Rodney Fuller
(74) *Attorney, Agent, or Firm* — Mark Farrell Patent Law PC

(57) ABSTRACT

A panorama head for optical equipment is provided. In one implementation, the panorama head secures a camera or other optical device and enables the camera or device to pan at a parallax-free pivot point near the lens of the camera or device. An example panorama head includes multiple features for attaching in different ways to different types of external tripods, clamps, balls, and mounts to enable panoramic panning in the portrait mode and in the landscape mode. The attachments include quick release features to switch quickly between portrait and landscape modes. In one implementation, the panorama head is constructed of two plates for low-cost, lightweight, and easy-to-use construction.

17 Claims, 3 Drawing Sheets

PANORAMA HEAD FOR OPTICAL EQUIPMENT

RELATED APPLICATIONS

This patent application claims the benefit of priority to U.S. Provisional Patent No. 61/458,638 to Harwick, filed Nov. 29, 2010 and incorporated herein by reference in its entirety.

BACKGROUND

Since the late 1800's photographers have taken multiple overlapping photos and combined ("stitched") them into panoramic images. However, unless special care is taken to rotate the camera around the "no parallax point" of the camera between taking the necessary photographs, there will be parallax errors that make it impossible to truly match the different overlapping photos. These problems are well documented in the prior art (see, e.g., Juergen Gulbins, *Digital Photography from the Ground Up*, Rocky Nook, 2008).

Numerous devices, known as "panoramic heads," have been constructed and several are for sale that are designed to place the camera in and rotate the camera about the "no parallax point" and eliminate the parallax problem (e.g., see U.S. Pat. No. 5,589,903 to Speggiorin). These devices perform positioning of cameras and other optical devices in a relatively complex manner by providing an articulated joint adjustable in 2-dimensions for each of the 3-dimensional axes. Each articulated joint is a kinematic reduction coupling with first and second coupling elements which are fixed to first and second joint elements during rotation about corresponding axes and are movable between a position of mutual coupling for precision adjustments and a position of mutual disengagement for quick positioning. Problems with currently available devices include that they are expensive, heavy, cumbersome, and difficult to set-up properly; they are meant for the professional photographer and therefore demand some skill. Furthermore, they do not take advantage of the positional capabilities of tripod heads; but instead they add another layer of complexity.

In recent years, because of the increase in the availability of reasonably priced and easy to use digital cameras, many people all around the world have become interested in panoramic photography. Combining or "stitching" the photos has become quite easy because of reasonably priced computer software; but this software cannot compensate for parallax errors within the photos. However, the currently available models of panoramic heads which could be used to overcome the parallax errors do not appeal to amateur photographers because of cost, weight, and difficulty of use. What is needed is a device that addresses and solves each of these issues so that the amateur photographer can have a small, lightweight, easily carried, rugged, affordable, and easy to use piece of equipment that provides a way to acquire parallax-error-free panoramas.

SUMMARY

A panorama head for optical equipment is provided. In one implementation, the panorama head secures a camera or other optical device and enables the camera or device to pan at a parallax-free pivot point near the lens of the camera or device. An example panorama head includes multiple features for attaching in different ways to different types of external tripods, clamps, balls, and mounts to enable panoramic panning in the portrait mode and in the landscape mode. The attachments include quick release features to switch quickly between portrait and landscape modes. In one implementation, the panorama head is constructed of two plates for low-cost, lightweight, and easy-to-use construction.

This summary section is not intended to give a full description of panorama heads for optical equipment, or to provide a list of features and elements. A detailed description of example embodiments of the panorama head for optical equipment follows.

BRIEF DESCRIPTION OF THE DRAWINGS

The characteristics and advantages of an example panorama head for optical equipment will become clearer from the following detailed description of a preferred embodiment thereof, described by way of non-limiting example with reference to the appended drawings, in which.

DETAILED DESCRIPTION

Overview

This disclosure describes a panorama head for optical equipment. In one implementation, an example panorama head secures optical equipment in the manner of a "camera mount," to a supportive device, such as a monopod or tripod. A camera will be used herein to represent optical equipment that may benefit from the described panorama head. The example panorama head moves the center of rotation of the secured camera or optical equipment away from the base of the camera tripod socket to the "parallax-error-free" point of the lens for the purpose of eliminating parallax error. Hereafter, the term "tripod" will be used loosely to include many support systems, including a monopod. Though applicable to similar optical equipment, a preferred embodiment is compatible with a 35 mm camera and film or with an equivalent or similar-size digital camera. The example panorama head incorporates two separate quick disconnect plates for quickly mounting to a tripod fixture in either the vertical ("portrait") mode for the purpose of making a taller panorama of a horizontal scene, or in the horizontal ("landscape") mode for widening a vertical panorama, as when capturing a tall building in the vertical panorama. The example panorama head may be mounted on top of an existing pan, or on a ball head, and takes advantage of the positioning capability of these supports so that the example panorama head does not have to duplicate those positioning features.

Example Implementation

In one implementation, an example panorama head consists of two plates that slide against each other to adjust the length from, for example, 3.5 inches to 8 inches from the camera's tripod mounting hole to the parallax-free point of the lens. Spacers between the two plates can provide an additional adjustment to compensate for slight differences found between camera brands and models for the varying distance between camera base and the center axis of the lens. Two knob screws may secure the two plates together to lock the length of the device.

The camera may be secured to the example panorama head by a single knob screw through a plate and into the camera tripod socket. A safety strap made of a hook-and-eye fastener such as VELCRO, can wrap around a part of the example panorama head and the attached camera lens, which further stabilizes the combined assembly. Mounting the camera and the attached panorama head to a tripod or other support can be accomplished by one the aforementioned quick disconnect plates, or by, for example, a "¼-20" size hole in a plate of the panorama head that replicates the camera tripod socket.

Figure 1:
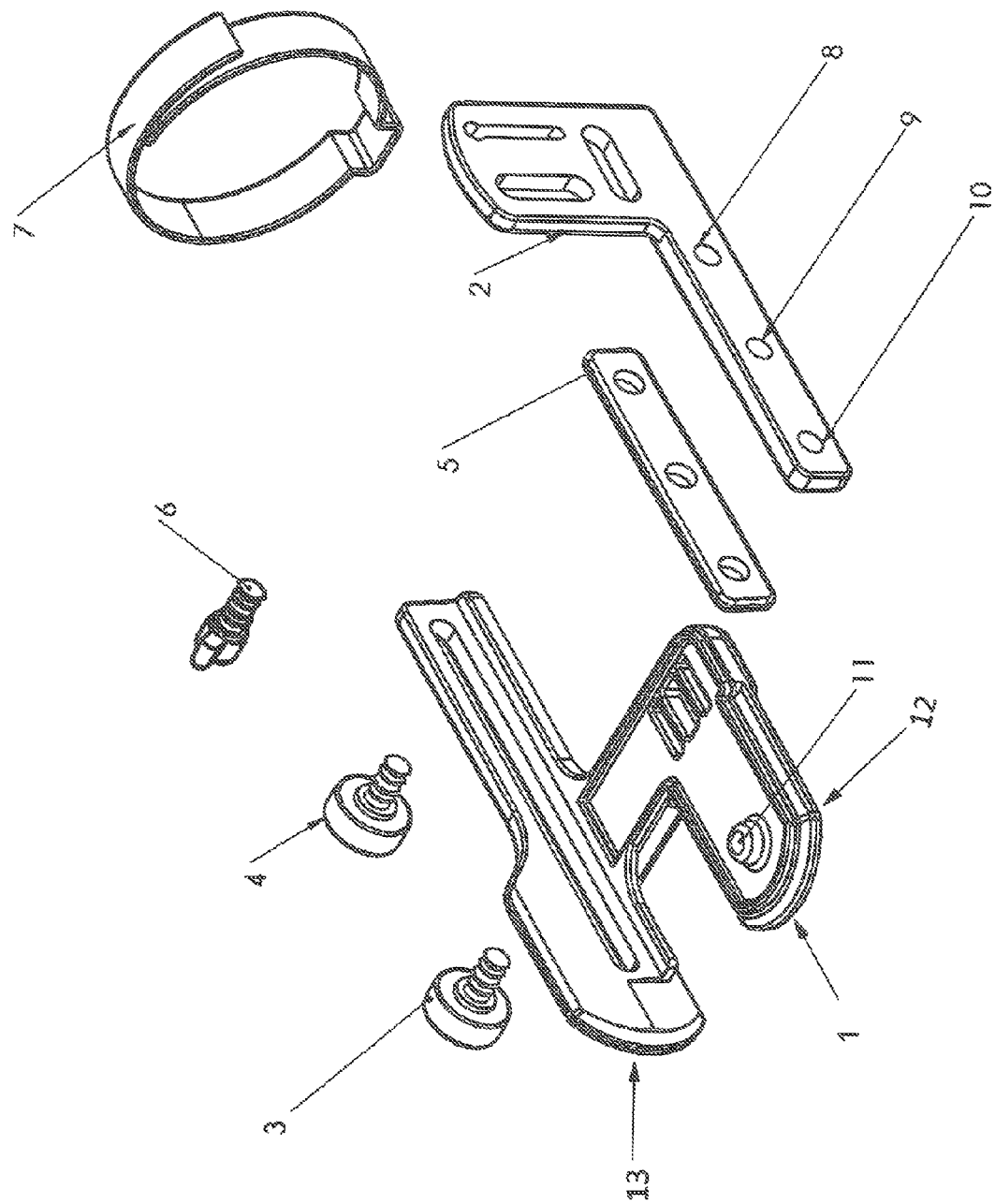
FIG. 1 is an exploded view of an example panorama head.

FIG. 1 shows an exploded view of the example panorama head. In one implementation, a camera is attached to the rear plate 2. Plate 2 is attached to the front plate 1 with locking knobs 3 and 4 that thread into any of the threaded holes 8, 9, or 10 in plate 2. The spacer 5, which has holes that match the holes in plate 2, can be used between plates 1 and 2 if necessary for properly locating the lens so that the center of the lens is directly over the lens pad 11.

Figure 2:
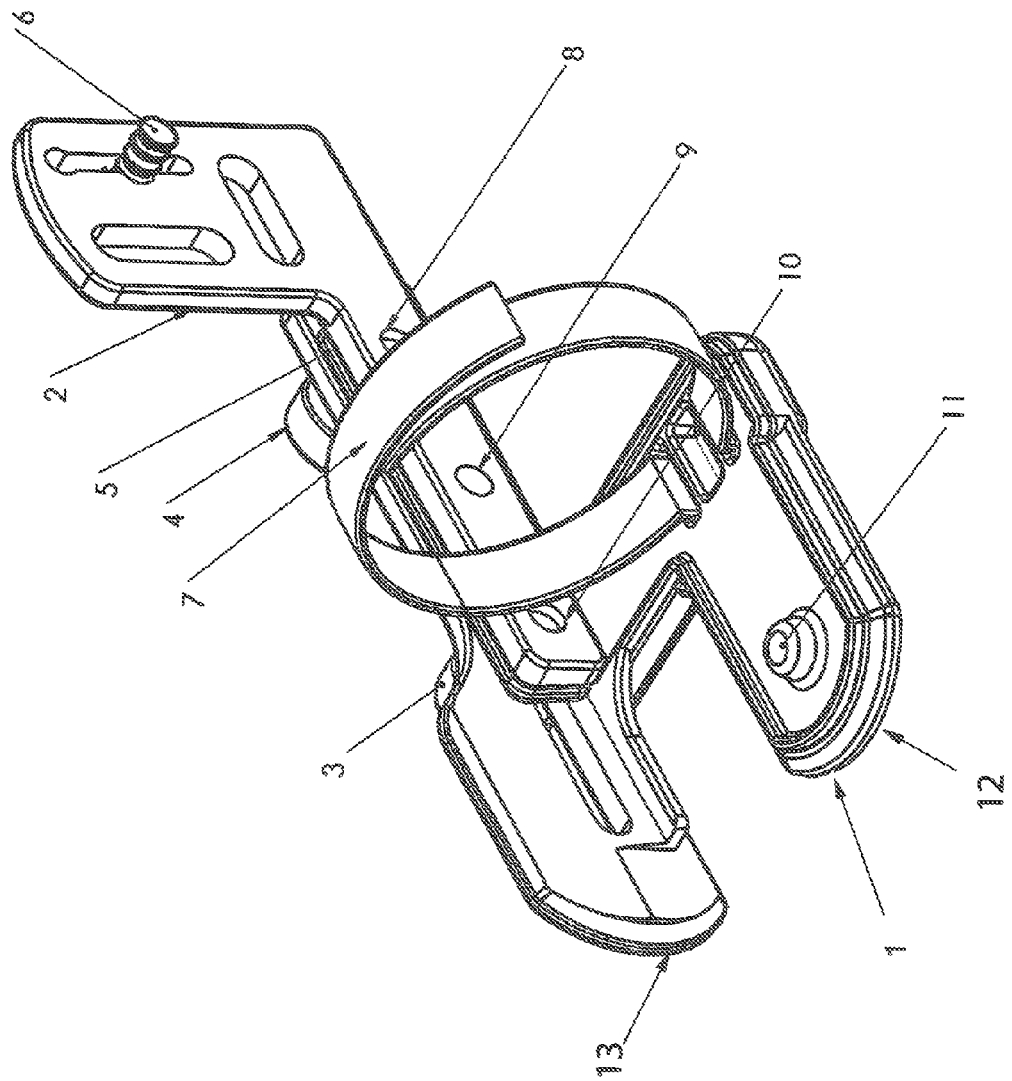
FIG. 2 is a perspective view of the example panorama head viewed from a side on which the camera is attached.
Figure 3:
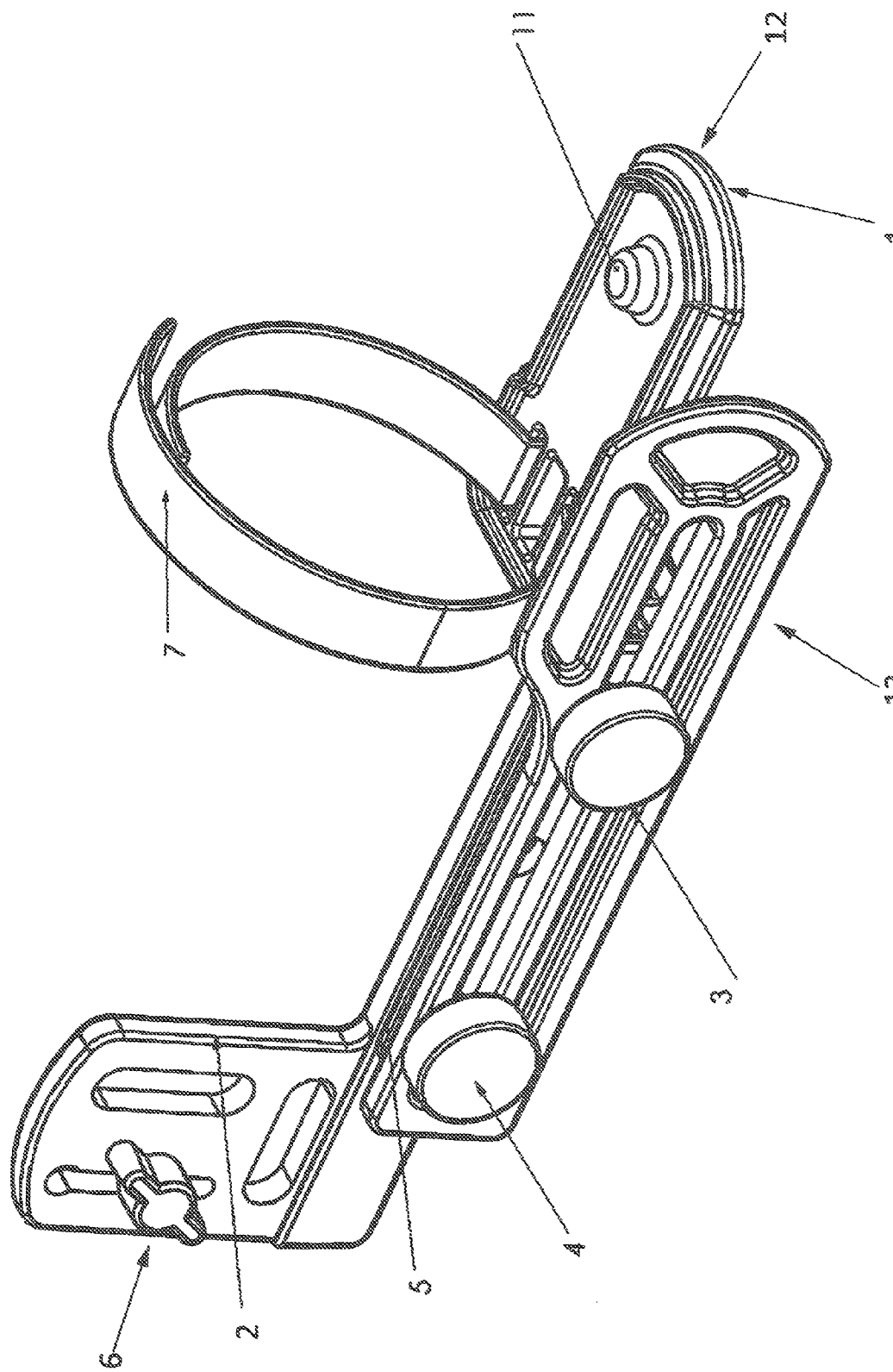
FIG. 3 is a perspective view of the example panorama head viewed from a back side of the device.

FIGS. 2 and 3 illustrate the position that the example panorama head would be in when the camera is oriented vertically (portrait mode). The camera is attached to the device using screw 6 in plate 2 using a standard tripod mounting screw hole on the camera. The camera lens lies on top of front plate 1 and rests on lens pad 11. The lens is secured to the device using the strap 7 which in a preferred embodiment is made of the hook-and-eye fastener material VELCRO. The entire assembly is attached to the tripod using part 12 or 13 on plate 1. In addition, the device may be attached to the tripod support using a ¼-20 screw hole under the lens pad 11.

In FIG. 3, the working length of the example panorama head is adjusted by loosening locking knobs 3 & 4 and sliding the front and rear plates 1 & 2 to the desired distance, then tightening the two locking knobs 3 & 4 to hold the desired position. As a first approximation of the parallax-free point, the entry pupil of the lens can be aligned over the new center of rotation 11. The adjustment can be further refined to achieve the true parallax-free point using methods indicated in the published literature. Once the device length is adjusted for a given lens, the length need not be adjusted again till there is a change of camera or lens.

In one implementation, there are three ¼"-20 tapped holes in the plate 2 to receive the front 3, and rear 4 locking knobs. By selecting which holes 8, 9, 10 are used, the photographer can maximize stability, or range of adjustment, to suit a wide variety of cameras and lenses.

Using the above process, the center of rotation of the camera lens has now been moved from the tripod socket 6, to the parallax-free point 11 of the lens so that a series of photos can be shot from the same point of view without significant parallax error. The example panorama head with camera attached is rotated using the known adjustments on the tripod head. "Rotate" as used herein, may include or be used interchangeably with "pan." Additional information and suggestions regarding the best ways to take the photos needed to make a panorama are readily available in the literature. The result of the above procedure made possible by the example panorama head is a group of photos that can be easily stitched together to make one large panoramic photo without parallax errors.

The front plate 1 also has two surfaces 12 and 13 that have tapered sides and proper height, width, and length to fit into a standard quick disconnect ball or pan head clamp such, as the Arca Swiss size. This easily allows changing the orientation of the camera from vertical, using surface 12, to horizontal, using surface 13, by simply loosening the tripod clamp, sliding out the example device, rotating the example device 90 degrees, inserting the other surface into the clamp, and tightening the clamp again. This feature can save considerable time over existing techniques and also maintains the parallax-free settings of the camera.

Plates 1 and 2 and other components of the example panorama head can be made of ferrous metals, non-ferrous metals, plastics, composite materials or a combination of these.

An example panorama head is lightweight and sufficiently rigid and strong to hold the weight of the desired camera. In an embodiment, the front plate 1, rear plate 2, and the spacer 5 are made of a carbon fiber composite material. Various changes and modifications to the described implementation of the panorama head may be made without departing from the spirit and scope of the present disclosure.

While some familiarity with the principals and guidelines of multi-photo panoramic images is necessary for successful panoramic photography, the example panorama head provides a rugged, lightweight, easy-to-use accessory that appeals to amateur photographers and greatly simplifies the process of reducing parallax errors between the various frames which make up a panoramic photo, providing improved panoramas.

CONCLUSION

Although example implementations have been described in language specific to structural features and/or methodological acts, it is to be understood that the subject matter defined in the appended claims is not necessarily limited to the specific features or acts described. Rather, the specific features and acts are disclosed as exemplary forms of implementing the claimed systems, methods, and structures.

The invention claimed is:

1. An apparatus, comprising:
   a rear plate;
   a fastener on the rear plate for securing an optical device to the rear plate;
   a front plate slidably attached to the rear plate for adjusting a distance between the fastener on the rear plate and a parallax-free point for obtaining parallax-free panoramic images with the optical device;
   at least one means for attaching the front plate to an equipment mount for pivoting the optical device at the parallax-free point for obtaining the panoramic images;
   wherein the parallax-free point is determined only by slidinq the front plate and the rear plate in relation to each other; and
   wherein the parallax-free point is maintained between a portrait orientation of the apparatus and a landscape orientation of the apparatus without readjusting the front plate and the rear plate in relation to each other.

2. The apparatus of claim 1, further comprising thumbscrews;
   wherein the distance can be fixed by locking the front plate and the rear plate together with the thumbscrews.

3. The apparatus of claim 1, wherein the equipment mount comprises one of a tripod, a monopod, a gimbal mount, a quick disconnect ball, a pan head clamp, an Arca Swiss mount, or a standard camera mount.

4. The apparatus of 1, wherein the front plate further comprises multiple means for attaching the front plate to an equipment mount;
   wherein a first means for attaching the front plate to the equipment mount is positioned at 90 degree from a second means for attaching the front plate to the equipment mount.

5. The apparatus of claim 4, wherein the first means enables the optical device to rotate in a first plane and the second means enables the optical device to rotate in a second plane perpendicular to the first plane.

6. The apparatus of claim 5, wherein the first means and the second means are quick release attachments.

7. The apparatus of claim 6, wherein the first means and the second means enable the optical device to obtain panoramic images in a portrait mode and a landscape mode, respectively; and wherein the quick release attachments enable the optical device to switch quickly between the portrait mode and the landscape mode.

8. The apparatus of claim 4, further comprising multiple means in each plane of the front plate for attaching to an equipment mount, including a foot in each plane to fit a standard clamp and a slot or a threaded bolt in each plane to fit a standard mount hole.

9. The apparatus of claim 1, wherein the front plate comprises a fork shape, wherein a first tine of the fork fits into a standard clamp mount to obtain images in a portrait mode, and a second tine of the fork fits into a standard clamp mount to obtain images in a landscape mode.

10. The apparatus of claim 1, further comprising a means for securing a lens of the optical device to the front plate.

11. The apparatus of claim 10, wherein the means for securing the lens of the optical device comprises a strap attached to the front plate.

12. The apparatus of claim 11, wherein the strap comprises a quick attach and quick release hook-and-eye material.

13. The apparatus of claim 10, further comprising a lens pad, wherein the lens pad works in conjunction with the means for securing the lens to secure the lens to the front plate.

14. A panorama head, comprising:
means for securing a camera to the panorama head;
adjustment means to rapidly coordinate the pivot point with a parallax-free point for obtaining panoramic images;
means for panning the panorama head on the pivot point at a lens of the camera;
wherein the parallax-free point is determined by moving the adjustment means in only one dimension; and
wherein the parallax-free point is maintained between a portrait orientation of the panorama head and a landscape orientation of the panorama head without reusing the adjustment means.

15. The panorama head of claim 14, further comprising means for panning the panorama head in a portrait mode and means for panning the panorama head in a landscape mode.

16. The panorama head of claim 15, further comprising means for switching rapidly between the portrait mode and the landscape mode.

17. The panorama head of claim 15, further comprising:
multiple different means of attaching the panorama head to an external mount in the portrait mode; and
multiple different means of attaching the panorama head to the external mount in the landscape mode.

* * * * *